United States Patent

Feldman et al.

[11] Patent Number: 5,353,645
[45] Date of Patent: Oct. 11, 1994

[54] DEVICE TO MEASURE THE DEFORMATION OF A STRUCTURAL COMPONENT

[75] Inventors: Joachim Feldman, Neustadt; Axel Stender, Hameln, both of Fed. Rep. of Germany

[73] Assignee: Wabco Standard GmbH, Hanover, Fed. Rep. of Germany

[21] Appl. No.: 991,985

[22] Filed: Dec. 17, 1992

[30] Foreign Application Priority Data

Dec. 21, 1991 [DE] Fed. Rep. of Germany ....... 4142671

[51] Int. Cl.$^5$ ................................................. G01B 7/16
[52] U.S. Cl. ........................................ 73/768; 73/784; 73/779
[58] Field of Search .............. 73/760, 768, 767, 772, 73/782, 784, 862.041, 862.392, 862.393, 784

[56] References Cited

U.S. PATENT DOCUMENTS

| | | | |
|---|---|---|---|
| 2,813,709 | 11/1957 | Brier | 265/42 |
| 3,380,167 | 4/1968 | Abel, Jr. et al. | 73/784 X |
| 3,872,719 | 3/1975 | Beus et al. | 73/784 X |
| 4,269,070 | 5/1981 | Nelson et al. | 73/779 |
| 4,429,579 | 2/1984 | Wilhelm | 73/768 |
| 4,526,044 | 7/1985 | Moser et al. | 73/768 X |

FOREIGN PATENT DOCUMENTS

| | | |
|---|---|---|
| 2537369 | 3/1977 | Fed. Rep. of Germany . |
| 2727173 | 3/1978 | Fed. Rep. of Germany . |
| 2647780 | 4/1978 | Fed. Rep. of Germany . |
| 2837945 | 10/1985 | Fed. Rep. of Germany . |
| 3843869 | 6/1990 | Fed. Rep. of Germany . |
| 231851 | 1/1986 | German Democratic Rep. . |
| 1294615 | 11/1972 | United Kingdom . |

*Primary Examiner*—Hezron E. Williams
*Assistant Examiner*—James M. Olsen
*Attorney, Agent, or Firm*—Meltzer, Lippe, Goldstein, Wolf, Schlissel & Sazer

[57] ABSTRACT

A device for measuring the deformation of a structural component comprises a sensor installed at a first end of a hollow bore in the structural component, the sensor having a measuring surface and producing an electrical signal indicative of a deformation in the measuring surface, and a transmission element which passes through the hollow bore. The transmission element has a first end which is supported by the structural component, and a second end which bears upon the measuring surface of the sensor, so that a deformation which occurs in the structural component will be transmitted to the measuring surface by the transmission element.

11 Claims, 7 Drawing Sheets

DEVICE TO MEASURE THE DEFORMATION OF A STRUCTURAL COMPONENT

BACKGROUND OF THE INVENTION

The invention relates to a device for measuring the deformation of a structural component.

Devices of this type are known. Generally, they use measuring elements which are based on strain gauges glued or attached in some other manner (e.g., spattered on) to the structural component the deformation of which is to be measured. These measuring elements must be attached to the structural component with great care. For this reason the known devices are expensive.

It is therefore the object of the instant invention to provide a device for measuring the deformation of a structural component which is simple and inexpensive to produce.

SUMMARY OF THE INVENTION

This object is achieved in a device for measuring the deformation of a structural component which comprises a sensor installed at a first end of a hollow bore in the structural component, the sensor having a measuring surface and producing an electrical signal indicative of deformation in the structural component, and a transmission element passing through the hollow bore along its longitudinal axis. The transmission element has a first end which bears against the structural component and a second end which bears against the measuring surface. Thereby, any deformation of the structural component is conveyed to the measuring surface of the sensor by the transmission element.

In spite of careful execution, the manner in which the measuring elements have hitherto been attached in known devices does not always provide the stability under load required for continuous operation. However, the instant invention offers this stability under load without any problem.

The sensor provided for by the present invention is of current construction and is often used and known in a pressure or force sensor. Such a sensor is described for example in the "Datenblatt für Drucksensor D9/D7" (1990) of the WIKA Company of Germany.

The invention can be used in all technical fields in which it is desired to measure the deformation of a structural component.

The invention ensures a measuring result that is practically free from temperature influences if materials with the same thermal coefficient of expansion are used for the structural component and for the transmission element. For example, the same material may be used for both.

Additional advantages of the invention are discussed in the following explanation and through drawings of specific embodiments. In these drawings, the same reference numbers are used throughout for elements having the same functions.

DETAILED DESCRIPTION

Figure 1:
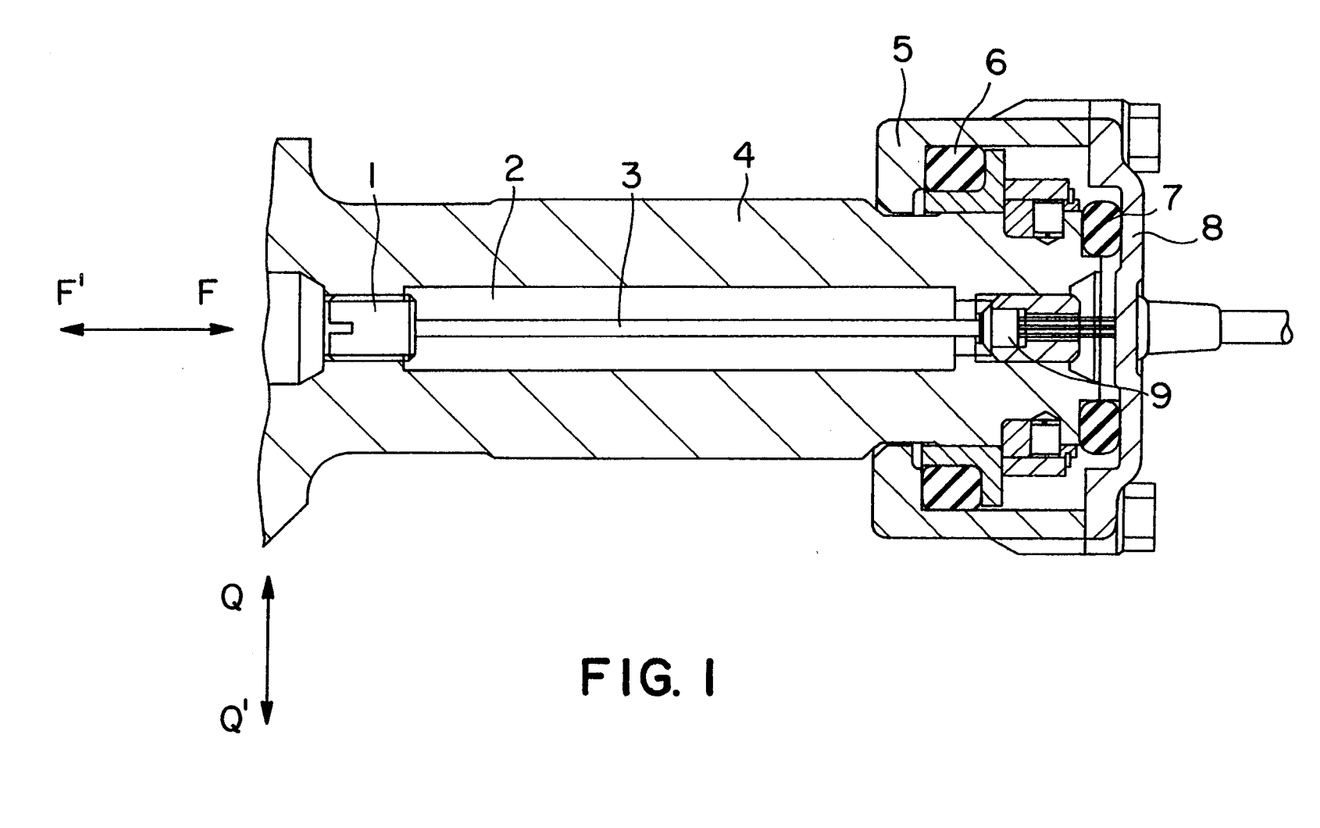
FIG. 1 shows a first basic embodiment of the present invention.

In FIG. 1, a structural component (4) is supported in any desired manner, and therefore not described in further detail, in a structure (5, 6, 7, 8) in such manner that the structural component (4) is able to accept forces and at least bending moments.

The structural component (4) is provided with an inner hollow space or bore (2) extending in a longitudinal direction. The hollow bore (2) is closed off at its ends in a manner to be described. At one end the closing off is effected by a sensor (9). The sensor (9) is attached in any normal and appropriate manner in the structural component (4). The sensor (9) is of a type which has a measuring surface and which emits an electrical signal dependent upon the deformation of this measuring surface. Sensors of this type are available in many different models. They are often used and designated as pressure or force sensors.

The hollow bore (2) contains a transmission element (3) passing through it longitudinally. The transmission element (3) bears at one end on the measuring surface of the sensor (9), and at its other end on the end of the hollow bore (2). The lateral position of the transmission element (3) in the bore (2) can be fixed by conventional centering or appropriate conventional mounting (not shown) at the ends of the hollow bore (2).

The transmission element (3) is shown in FIG. 1 centered with respect to the structural component, but it could also be positioned differently.

If the structural component (4) is put under load by forces or force components in its longitudinal direction as indicated by the double arrow F-F', the resulting difference in distance between the supporting points of the transmission element (3) and thereby a change in length of the structural component (4) is transmitted by the transmission element (3) to the measuring surface of the sensor (9), whereupon said surface is deformed and the sensor (9) emits a corresponding electric signal. This signal, called the deformation signal hereinafter, can also be evaluated as the force signal characterizing the resulting force.

In the above-mentioned case where the transmission element (3) and thereby the arrangement of sensor (9) and transmission element (3) are not in the center of the structural component (4), the embodiment is also suitable for the measuring of deformations resulting from forces or force components acting in a transverse direction, as indicated by the double arrow Q-Q', or of the forces themselves and of a corresponding bending moment. In such case, the transmission element (3) and the sensor (9) are located outside a neutral axis of the structural component (4) so that the transmission element (3) will transmit changes in length resulting from these forces or bending moments and representing its position within the structural component (4) to the sensor (9).

For measurements in both directions of the double arrow F-F' and/or of the double arrow Q-Q', it is preferable to support the transmission element (3) so that it already pre-stresses the sensor (9) when the structural component (4) is still free of load, i.e., it already deforms the measuring surface. The sensor (9) then transmits a base signal with a load-free structural component and said base signal is modulated according to the measure taken of the forces and/or bending moments received by the structural component.

The sensor (9) can be pre-stressed advantageously and in a simple manner and can be rendered adjustable if the second end of the hollow bore is closed off by means of a screw-in plug (1) upon which the transmission element (3) bears at that end as shown in FIG. 1. The position of the transmission element (3) in relation to the sensor (9) and thereby its pre-stress can be adjusted by means of the screw-in plug (1). If the advantage of adjustability is not desired, or if this advantage can be achieved by other means, this end of the hollow bore (2) can be closed off in any other conventional manner.

Figure 2:
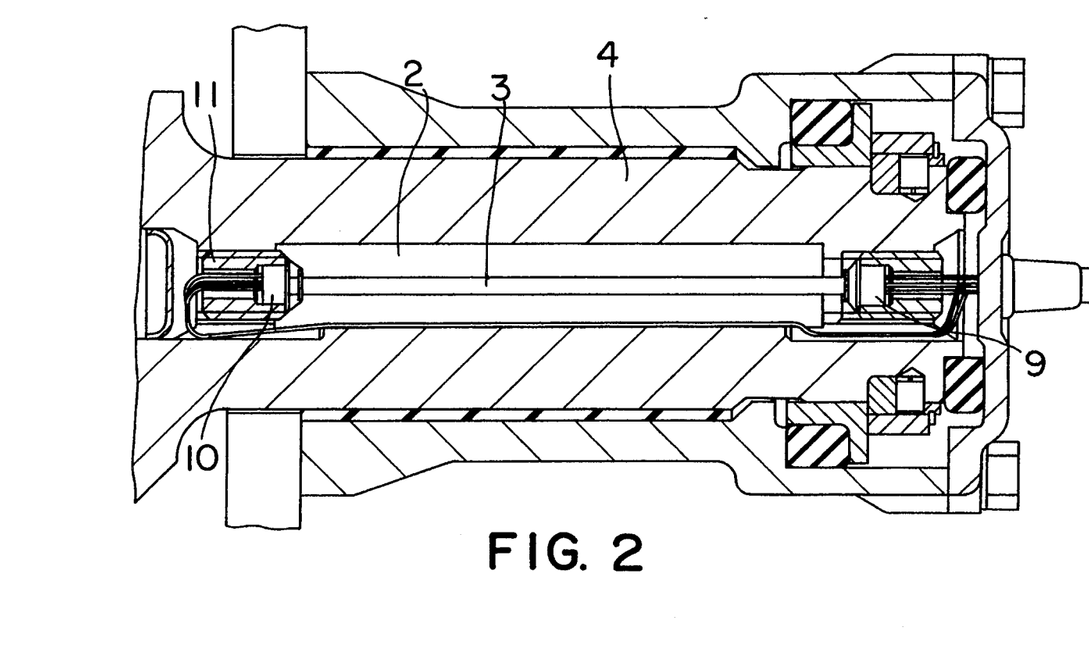
FIG. 2 shows a second basic embodiment.

In the embodiment of FIG. 2, the hollow bore (2) is closed off at the end across from sensor (9) by a second sensor (10), which is identical to sensor (9), upon which the transmission element bears at this end.

In this case the deformation signals of the two sensors (9, 10) can provide a signal amplification obtained through addition or a mean signal value formed through averaging.

The sensor (10) is mounted in a screw-in plug (11) screwed into the structural component (4) at the concerned end of the hollow bore (2). The position of the transmission element (3) in relation to the sensors (9, 10) can be adjusted and thereby pre-stress of both sensors (9, 10) can be produced and adjusted for the above-mentioned purpose by adjusting the screw-in plug (11).

Figure 3:
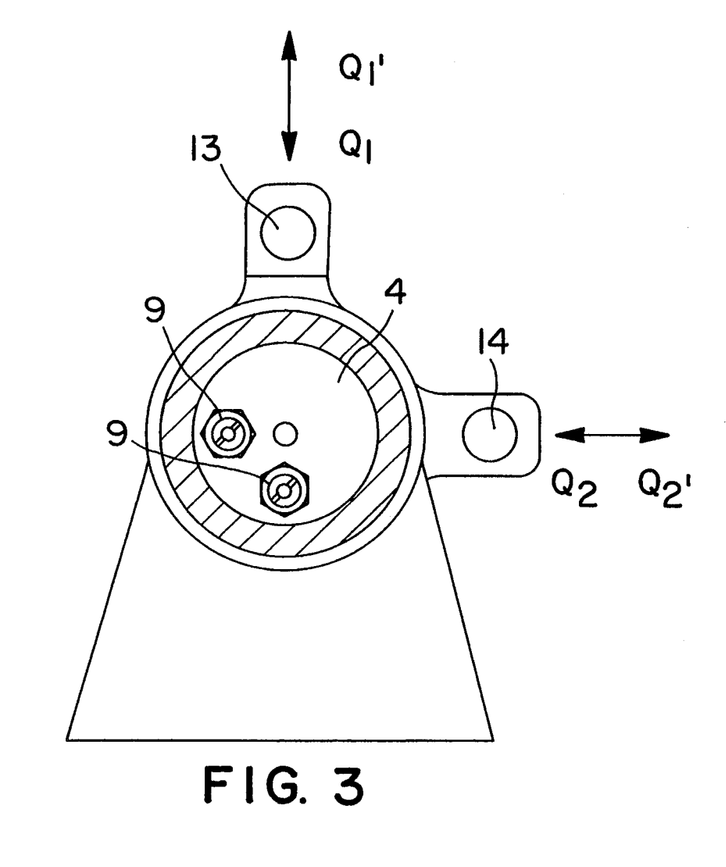
FIGS. 3 and 4 show a third basic embodiment.
Figure 4:
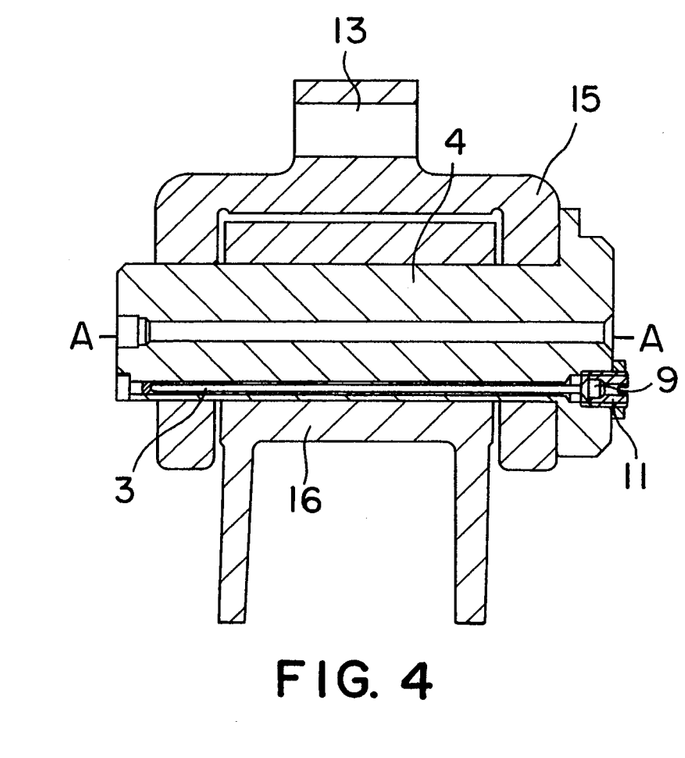

In the embodiment according to FIGS. 3 and 4, the structural component (4) and the support elements (15, 16) constitute a counter-bearing. Forces exerting bending moments upon the structural component (4) are introduced into the counter-bearing via force-introduction points (13, 14) in one support element (15) as indicated by the double arrows $Q_1$–$Q_1'$ and $Q_2$–$Q_2'$ in directions transverse and perpendicular to each other.

As best seen in FIG. 3, in this embodiment, two arrangements of transmission elements (3) and sensors (9) similar to those according to the embodiment shown in FIG. 1 are contained in the structural component (4). The difference between this arrangement and that of the embodiment of FIG. 1 is that in order to obtain and adjust pre-stress, the sensors (9), as in the case of sensor (10) in the embodiment of FIG. 2, are mounted in screw-in plugs (11) and the opposite ends of the hollow bore are closed off completely.

The arrangements of transmission elements (3) and sensors (9) shown in FIGS. 3 and 4 are off-centered by 90° and are side-by-side in the structural component (4), whereby the transmission elements (3) are parallel to the longitudinal axis (AA) of the structural component, but are centered respectively in relation to the transverse directions $Q_1$–$Q_1'$ and $Q_2$–$Q_2'$. Thereby, each arrangement of transmission element (13) and sensor (9) is effective only for a force in that transversal direction to which it is centered. With respect to the other transversal direction, each arrangement lies in the neutral axis. When employing the deformation signals from the sensors (9) as force signals, this arrangement permits one to determine the direction of the resulting force and the plane of the resulting bending moment. Vice versa, in cases in which a force or a resulting force acts on a structural component (4) in a certain plane, this arrangement permits the determination of the components of said force in the transversal direction $Q_1$–$Q_1'$ and $Q_2$–$Q_2'$.

Figure 5:
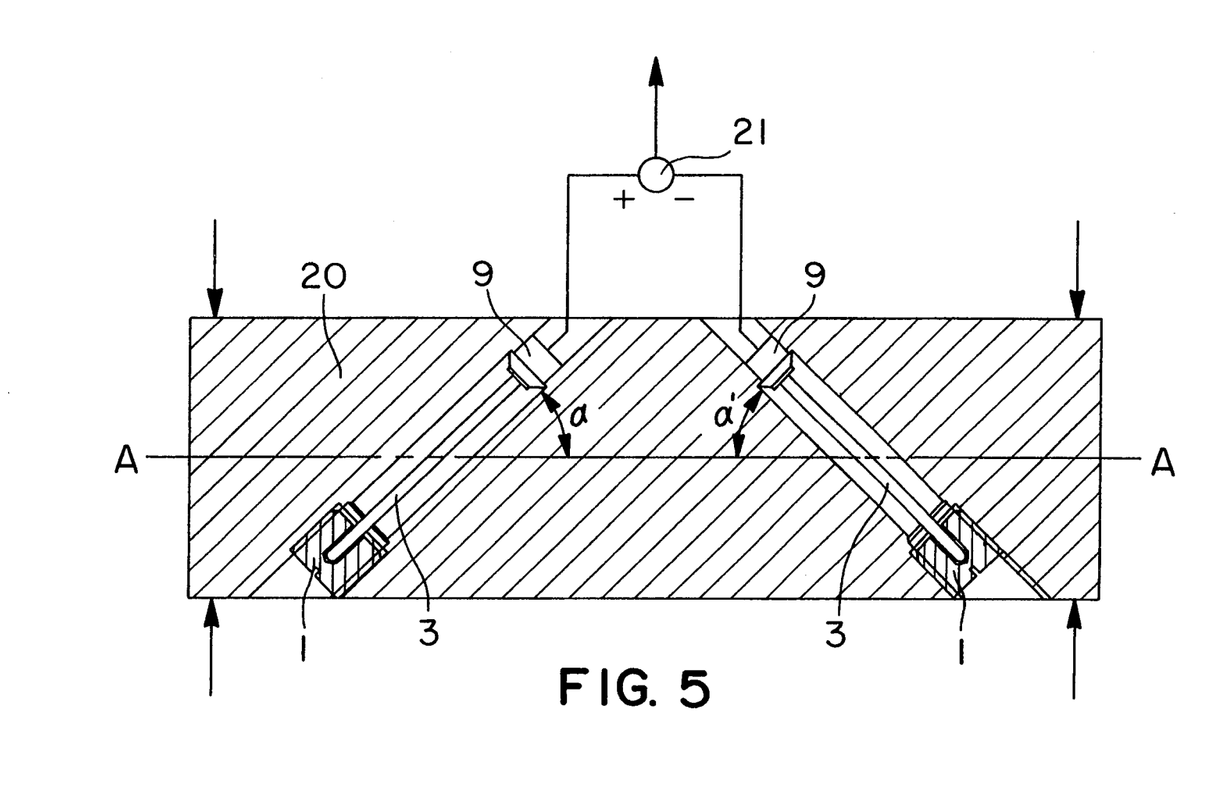
FIG. 5 shows a fourth basic embodiment.

In FIG. 5, two arrangements of sensors (9) and transmission elements (3) form identical angles ($\alpha$ and $\alpha'$) with the longitudinal axis (AA) of the structural component (20), but they are at contrary inclinations.

This embodiment makes it possible to measure shearing stresses which are caused by bending moments in the structural component (20). The deformation signals of both sensors (9) are transmitted to an adding device (21) indicated schematically. The adding device (21) cancels out the deformation signal portions caused by bending moments against each other and transmits only the portions of the deformation signals caused by the shearing stresses.

Figure 6:
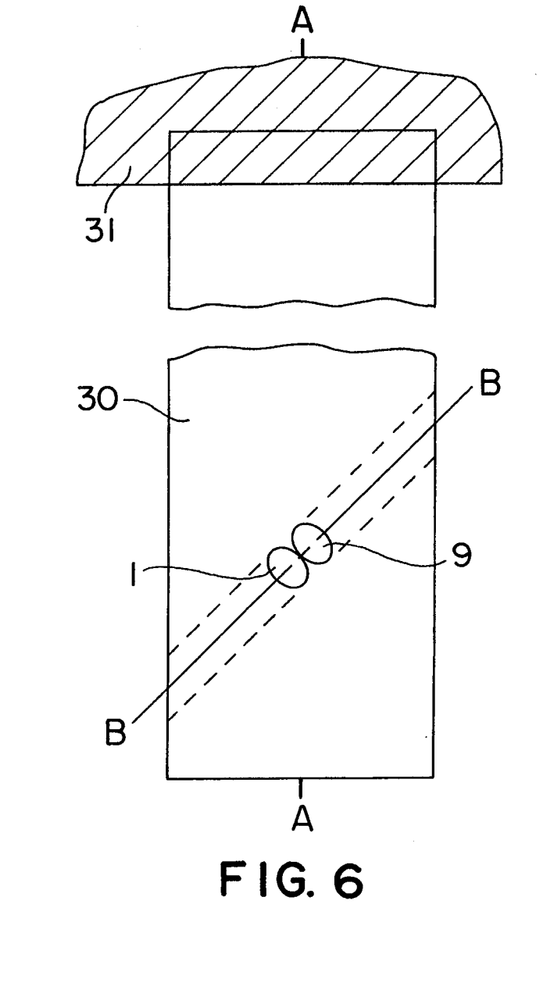
FIGS. 6 and 7 show another basic embodiment.
Figure 7:
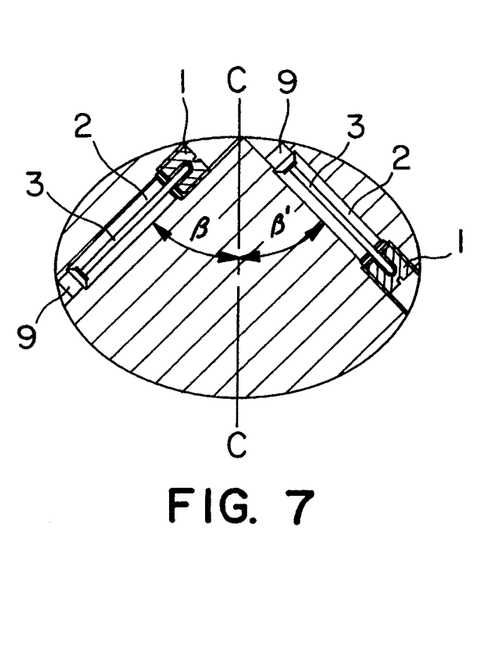

In the embodiment according to FIGS. 6 and 7, the structural component (30) shown in a top view in FIG. 6 is held non-rotatably by supporting element (31). In FIG. 6, an intersecting line at an angle to the longitudinal axis (AA) of the structural component (30) is furthermore indicated. This intersecting line is the penetration line (BB) of a plane perpendicular to the drawing.

FIG. 7 shows a section through the structural component (30) in the plane characterized by the penetration line (BB). It can be seen in FIG. 7 that two arrangements of sensors (9) and transmission elements (3) are placed in this plane. Each of these arrangements is at an identical angle ($\beta$ and $\beta'$) to a transversal axis (CC) of structural component (30) but are inclined in opposing directions.

In this arrangement, the bearing points of the transmission elements (3) are located in cross-sections of the structural component (30) which are expanded differently under the action of torque. The expansion differences in these cross-sections are transmitted by the transmission elements (3) to the respective sensor (9). The deformation signals of the sensors (9) are therefore especially well suited in this embodiment to measure torque forces or rotational forces acting upon the structural component (30).

This embodiment also functions in the manner described if only one arrangement of sensor (9) and transmission element (3) is provided.

In this embodiment, the plane characterized by the penetration line (BB) intersects the structural component (30) and the plane of the drawing at a right angle. This is not absolutely necessary. The plane in question can also intersect the structural component (30) and the plane of the drawing at some other angle.

Figure 8:
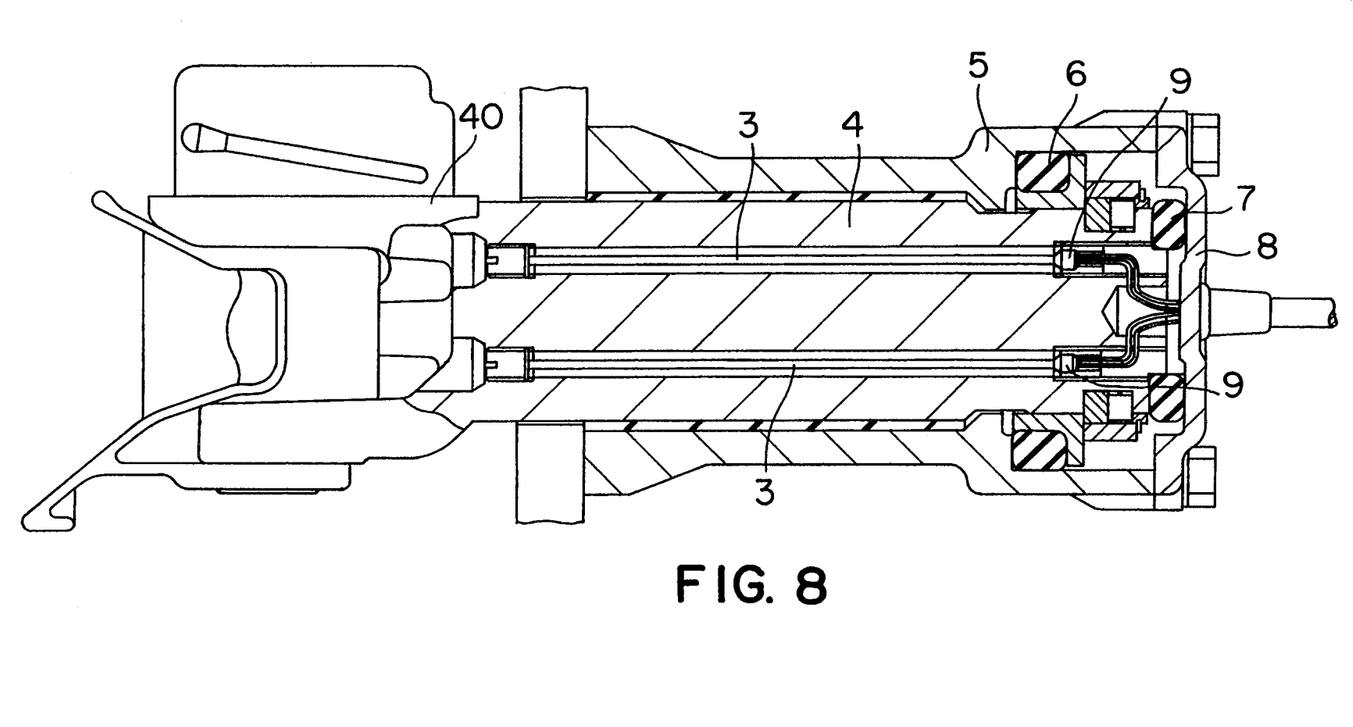
FIG. 8 shows an embodiment incorporated into a draw-bar coupling.

The embodiment according to FIG. 8 is applied to a draw-bar coupling shown schematically. In the technical field of road vehicles, such draw-bar couplings are used to connect a draw-bar trailer to a hauling vehicle, for instance.

The structural component (4) in this case is solidly connected to a coupling jaw (40) and transmits the forces coming from it to the structure (5, 6, 7, 8) which in this case is to be regarded as part of the hauling vehicle. In order to decrease jolts, some components (6, 7) of this structure are normally made of an elastomer.

Two arrangements of sensors (9) and transmission elements (3) according to the embodiment of FIG. 1 are installed off-center in the structural component (4). The deformation signal is evaluated in this case as a force signal characterizing the resulting draw-bar force or the resulting draw-bar bending moment.

Figure 9:
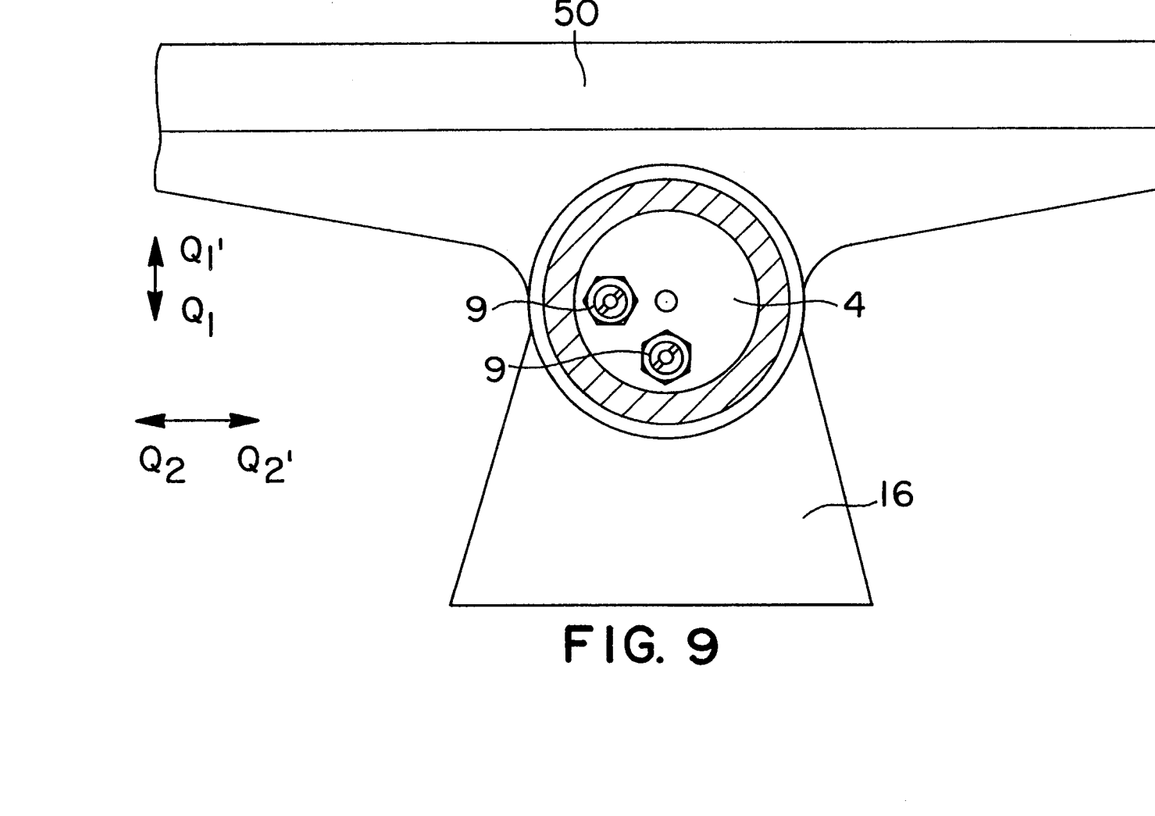
FIG. 9 shows an embodiment employed as a fifth wheel.

The application of the embodiment according to FIG. 9 is for a fifth wheel indicated schematically. In the technical field of road vehicles, such fifth wheels are used on the hauling vehicle to connect it to an articulated-train trailer.

This embodiment corresponds to that of FIGS. 3 and 4. The one support element (15) which has force introduction points (13) and (14) in that case is here made in the form of a coupling plate (50) or is firmly connected with one.

In this application, the fifth wheel (50) transmits a resulting force or a resulting bending moment upon structural component (4), the components of which in the transverse directions $Q_1-Q_1'$ and $Q_2-Q_2'$ are measured by the arrangements of deformation sensors (9) and transmission elements (3). This measurement is necessary because the components are evaluated for different purposes. The component in vertical direction $Q_1-Q_1'$ for example can be evaluated to regulate the brake pressure as a function of load, and the component in horizontal direction $Q_2-Q_2'$ for example can be evaluated for the purpose of a so-called coupling force regulation.

Insofar as no contradiction results from the above description, the explanations for one embodiment apply directly or through appropriate application also to the other embodiments. The embodiments or the principles of the invention they represent can also be used in combinations.

A person skilled in the art will recognize that the scope of protection for the instant invention is not exhausted by the descriptions of the embodiments but that it comprises all designs the characteristics of which are contained in the claims.

We claim:

1. A device for measuring deformation of a structural component, comprising a sensor installed at an open first end of a hollow bore in said structural component, said sensor closing off said hollow bore and having a measuring surface which is arranged substantially perpendicular to a longitudinal axis of said hollow bore, said sensor producing an electrical signal as a function of deformation of said measuring surface, and a transmission element passing through said hollow bore, said transmission element having a first end which bears upon said structural component and a second end which bears upon said measuring surface.

2. The device of claim 1 wherein the position of said transmission element is adjustable relative to said sensor.

3. The device of claim 1 wherein said transmission element bears upon said measuring surface with a prestress.

4. The device of claim 1 wherein said sensor and transmission element are installed in said structural component in a plane that is inclined with respect to a longitudinal axis of the structural component and form an angle with respect to a transverse axis of said structural component.

5. The device of claim 1 comprising first and second arrangements of sensors, transmission elements, and hollow bores in accordance with claim 1 installed in said structural components.

6. The device of claim 5 wherein said first and second arrangements are installed in said structural component at equal and opposite inclinations to a longitudinal axis of said structural component.

7. The device of claim 6 wherein said first and second arrangements are installed in said structural component in a plane that is inclined with respect to a longitudinal axis of said structural component, and said first and second arrangements form equal and opposite angles with respect to a transverse axis of said structural components.

8. The device of claim 5 wherein said first and second arrangements are installed in said structural component adjacent to each other and off-centered by 90°, said transmission elements being parallel to a longitudinal axis of said structural component.

9. A device for measuring the deformation of a structural component, comprising first and second sensors installed at first and second ends respectively of a hollow bore in said structural component, each of said first and second sensors having a measuring surface and producing an electrical signal as a function of deformation of said measuring surface, and a transmission element passing through said hollow bore, said transmission element having a first end which bears upon said measuring surface of said first sensor and a second end which bears upon said measuring surface of said second sensor.

10. The device of claim 9 wherein the position of said transmission element is adjustable relative to said first and second sensors.

11. The device of claim 9 comprising first and second arrangements of sensors, transmission elements, and hollow bores according to claim 9 installed in said structural component.

* * * * *